(No Model.)  2 Sheets—Sheet 1.

M. T. BUCHANAN.
SELF LOCKING ROLLER GATE.

No. 565,427. Patented Aug. 11, 1896.

Witnesses
Jas. Edmunds
S. McBain

Inventor
Mitchell T. Buchanan
By P. J. Edmunds,
Attorney.

(No Model.) 2 Sheets—Sheet 2.
M. T. BUCHANAN.
SELF LOCKING ROLLER GATE.

No. 565,427. Patented Aug. 11, 1896.

Witnesses
Jas. Edmunds
S. McBain

Inventor
Mitchell T. Buchanan
By P. J. Edmunds
Attorney.

UNITED STATES PATENT OFFICE.

MITCHELL T. BUCHANAN, OF INGERSOLL, CANADA.

SELF-LOCKING ROLLER-GATE.

SPECIFICATION forming part of Letters Patent No. 565,427, dated August 11, 1896.

Application filed February 24, 1894. Serial No. 501,360. (No model.)

*To all whom it may concern:*

Be it known that I, MITCHELL T. BUCHANAN, a subject of the Queen of Great Britain, and a resident of Ingersoll, in the Province of Ontario, Canada, have invented a new and useful Self-Locking Roller-Gate, of which the following specification, taken in connection with the accompanying drawings, forms a full, clear, and exact description.

The object of this invention is to provide a gate with attachments by means of which the driver in a vehicle, or a rider traveling along the road, across which the gate is a barrier, may readily and easily open said gate, and after passing the same may readily and easily close it without dismounting or leaving the vehicle; and it consists of the improved construction and combination of parts of the same, as will be hereinafter first fully set forth and described and then pointed out in the claim, reference being had to the accompanying drawings, forming a part of this specification, wherein—

Figures 1, 4, 5, 6:
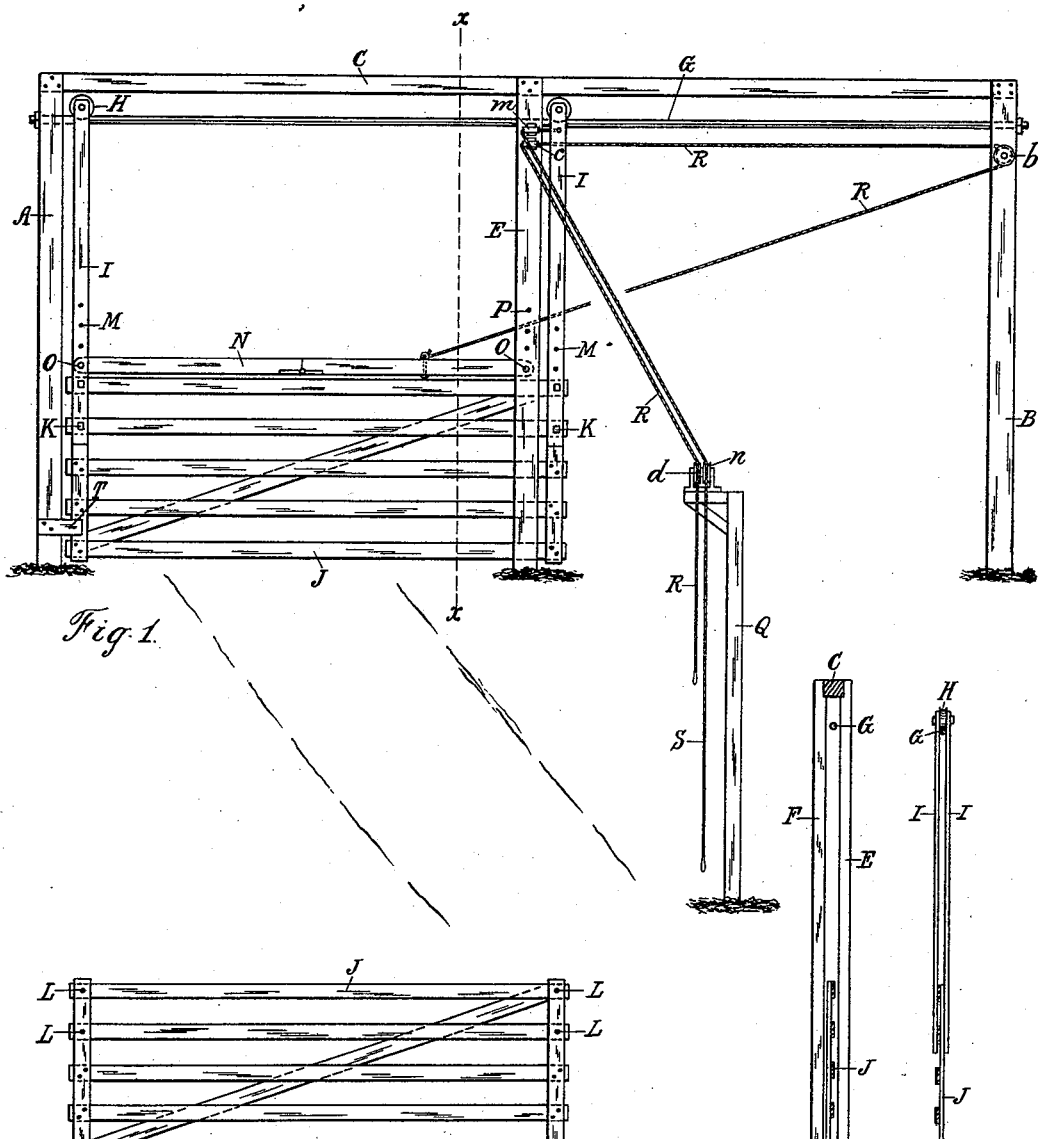
Figure 2:
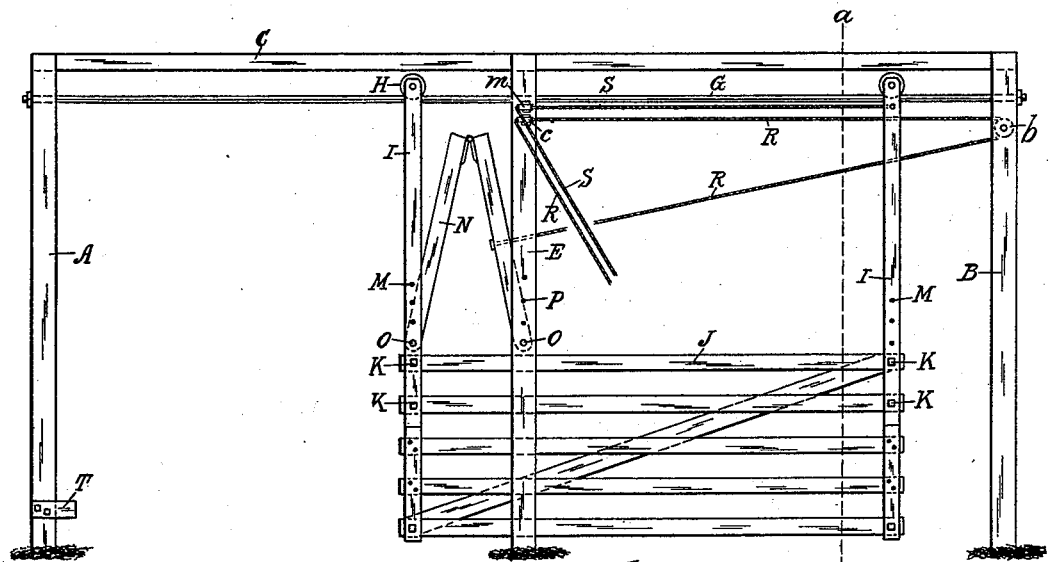
Figure 3:
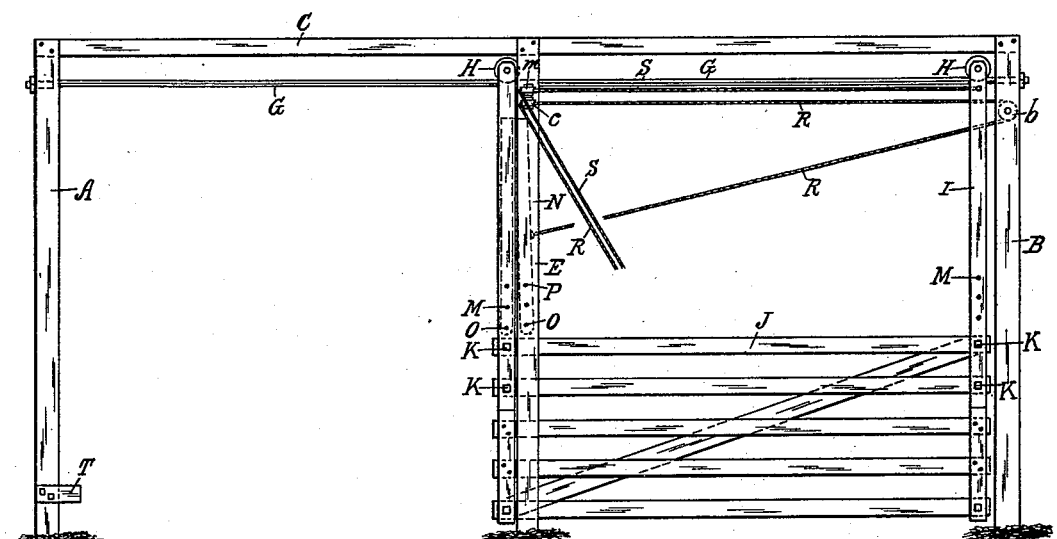

Figure 1 is a perspective view of a gate and connections, in its closed position, embodying my improvements. Fig. 2 is another view showing the gate partly opened. Fig. 3 is another view of the gate opened to its fullest extent. Fig. 4 is a detail view of the gate. Fig. 5 is a detail cross-sectional view of the bars E F and gate on the line $x\ x$ of Fig. 1. Fig. 6 is a detail cross-sectional view of the hangers and gate on the line $a\ a$ of Fig. 2.

A B designate standards rigidly secured in an upright position in any suitable manner or by any suitable means.

C designates a horizontal bar joining the upper ends of the standards A B, and E F are upright bars secured to the horizontal bar C, one on each side, and rigidly secured in an upright position in any suitable manner or by any suitable means and about midway between the standards A B.

G designates a track-rod extending between the bars E F and rigidly secured at its ends to the standards A B.

H H designate grooved antifriction-wheels fitted to travel perfectly free on the track-rod G.

I I designate hangers secured to the wheels H, one on each side, and between and to the lower ends of these hangers I I the gate J is secured by the pins K, projecting through the pinholes L and M in the gate J and hangers I, respectively.

Two or more pinholes M are formed in the hangers I I, so that the gate may be raised and the pins K projected through pinholes L in the gate J and higher pinholes M in said hangers I I, so that the gate can be operated above the snow in winter or permit the passage of small stock in summer.

N designates a jointed locking-bar pinned or otherwise pivotally secured at one end to one of the hangers I and at the other end to the upright bars E F by pins O, passing through pinholes M and P in the hanger I and upright bars E F, respectively, and two or more pinholes M and P permit the jointed locking-bar N to be raised or lowered with the gate.

Q designates a standard. (Shown particularly in Fig. 1.) One of these standards Q is rigidly secured in an upright position at a suitable distance from the gate J on the road side within convenient reach of the driver or a rider coming up to the gate.

R designates a rope secured at one end to the jointed locking-bar N, which rope R then extends to and passes over the antifriction-rollers $b$, $c$, and $d$ on the standard B, bar E, and standard Q, respectively.

S designates a rope secured to one of the hangers I, which then extends to and passes over the pulleys $m$ and $n$ on the bar E and standard Q, respectively.

T T designate guides, one of which is secured to each side of the standard A to prevent the gate J from being pushed or otherwise moved out of line when closed.

In the accompanying drawings one standard Q and one of each of the ropes R S and attachments only are shown; but this gate is provided with a standard Q, ropes R S, and attachments on each side, so that the gate may be opened and closed from either side.

The operation is as follows: When the gate J is closed, as shown in Fig. 1, by drawing down on the depending end of the rope R the jointed bar N is raised centrally, and with the raising of this bar N the gate J is moved horizontally and opened, said bar N and gate J being adjusted to the position shown in Fig. 3. The pulling down of this rope R to open the gate raises the depending end of the rope S at both sides of the gate simultaneously, because said rope S is secured to the hanger I, so that when the rider or driver has passed the gate he draws down on the depending end of the rope S. This adjusts the gate to the position shown in Fig. 1, thus closing the gate behind him. As the gate is closed, the horizontal bar N assumes the position shown in Fig. 1, which holds the gate locked and completely prevents it from being accidentally opened.

Having thus described my invention, I claim—

The two end posts A, B, the guide-posts E, F, the top connecting-bar C, and the track-rod G, combined with the gate, the supporting-rods I, secured to opposite ends of the gate, the rollers H, the antifriction-rollers $b$, $c$, $m$, the operating-ropes R, S, and the jointed bar N, having one end secured to the front end of the gate and the other to the posts E, F; the inner end of the rope R, being secured to the bar N, and the inner end of the rope S to the inner support I; the supports being provided with a series of perforations whereby the gate may be adjusted vertically substantially as shown.

In testimony whereof I have signed in the presence of the two undersigned witnesses.

MITCHELL T. BUCHANAN.

Witnesses:
P. J. EDMUNDS,
S. McBAIN.